US006970688B2

(12) United States Patent
Nibe

(10) Patent No.: US 6,970,688 B2
(45) Date of Patent: Nov. 29, 2005

(54) LOCAL OSCILLATOR SIGNAL DIVIDER AND LOW-NOISE CONVERTER EMPLOYING THE SAME

(75) Inventor: Masayuki Nibe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 426 days.

(21) Appl. No.: 10/253,782

(22) Filed: Sep. 25, 2002

(65) Prior Publication Data

US 2003/0060182 A1 Mar. 27, 2003

(30) Foreign Application Priority Data

Sep. 26, 2001 (JP) ............................ 2001-294293

(51) Int. Cl.[7] ................................................ H04B 1/26

(52) U.S. Cl. ...................... 455/323; 455/327; 455/282; 455/318; 333/117; 333/120

(58) Field of Search ............................... 455/323, 327, 455/326, 333, 337, 313, 324, 325, 328, 293, 455/314, 3.02, 131, 189.1, 190.1, 275, 344, 455/318–319, 307–311, 316, 282, 258, 259, 455/255, 147, 118, 312; 340/554; 324/76.39, 324/95; 327/47, 563, 105, 113, 355, 357, 327/359; 333/120, 117, 125, 128, 136, 116, 333/109, 121, 123, 161, 164; 330/255, 307; 343/705, 765, 797

(56) References Cited

U.S. PATENT DOCUMENTS

| | | | | |
|---|---|---|---|---|
| 3,845,461 A * | 10/1974 | Foreman | ...................... | 367/94 |
| 3,956,706 A * | 5/1976 | Saul | ............................ | 327/47 |
| 4,509,198 A * | 4/1985 | Nagatomi | .................... | 725/68 |
| 5,903,827 A * | 5/1999 | Kennan et al. | ............. | 455/326 |
| 6,507,952 B1 * | 1/2003 | Miller et al. | .................. | 725/76 |

FOREIGN PATENT DOCUMENTS

| | | |
|---|---|---|
| JP | 3-235405 A | 10/1991 |
| JP | 3-235406 A | 10/1991 |
| JP | 5-80006 U | 10/1993 |
| JP | 11-68421 | 3/1999 |

* cited by examiner

*Primary Examiner*—Edward F. Urban
*Assistant Examiner*—Charles Chow
(74) *Attorney, Agent, or Firm*—Birch, Stewart, Kolasch & Birch, LLP

(57) ABSTRACT

A rat race circuit has an annular transmission line formed on a microstrip dielectric substrate. A terminal for port 1 is formed at any given position of the annular transmission line. Respective terminals for port 2 and port 3 are formed at respective positions distant from the position of port 1 in the counter-clockwise and clockwise directions each by a distance of λg/4 (λg: effective wavelength). Moreover, at the position distant from the position of port 2 in the counter-clockwise direction by the distance of λg/4, a terminator resistor (R=50Ω) is formed. A local oscillator signal is supplied to port 1, and first and second mixer inputs are connected respectively to port 2 and port 3. The local oscillator signal divider and a low noise converter using the divider are thus provided that are scarcely influenced by matching with respect to mixers and provide stable performance and high isolation.

11 Claims, 14 Drawing Sheets

LOCAL OSCILLATOR SIGNAL DIVIDER AND LOW-NOISE CONVERTER EMPLOYING THE SAME

BACKGROUND OF THE INVENTION

1. Field of the Invention

The present invention relates to a local oscillator signal divider and a low-noise converter employing this divider. In particular, the present invention relates to a power divider for a local oscillator signal used particularly for an LNB (Low-Noise Block Downconverter) of a satellite broadcasting receiver, for example, for dividing a local oscillator signal, and relates to a low-noise converter using this divider.

2. Description of the Background Art

FIG. 9 is a block diagram schematically showing a conventional and typical satellite broadcasting receiving system. Referring to FIG. 9, an LNB 100 is attached to an antenna 101 in a so-called outdoor unit. LNB 100 amplifies, with low noise, extremely weak radio wave in the frequency range of 12.2–12.7 GHz, and converts the frequency range to the range of 950–1450 MHz. The resultant signal of low noise and satisfactory level is then transmitted via a coaxial cable 103 to an indoor receiver 104.

Indoor receiver 104 includes a DBS (Direct Broadcast Satellite) tuner 105, an FM demodulator 106, a video and audio circuit 107, and an RF modulator 108. From signals supplied through coaxial cable 103, DBS tuner 105 selects a signal of a selected channel, and the selected signal is demodulated by FM demodulator 106. Video and audio circuit 107 accordingly supplies video and audio signals that are converted by RF modulator 108 into RF signals for a television receiver 109, and RF modulator 108 supplies the RF signals to TV receiver 109. LNB 100 may be the one with two inputs for polarized wave signals and one output (hereinafter two-input one-output LNB) as shown in FIG. 10 or the one with two inputs for polarized wave signals and two outputs hereinafter two-input two-output LNB) as shown in FIG. 11.

Referring to FIG. 10, the incoming signal in the range of 12.2–12.7 GHz received by antenna 101 shown in FIG. 9 is supplied to the two-input one-output LNB and divided into a right-handed polarized signal and a left-handed polarized signal by a phase plate 112 within an input waveguide 111. Right-handed and left-handed polarized signals are allocated alternately to broadcast programs of even-numbered channels and broadcast programs of odd-numbered channels in order to prevent adjacent channels from interfering with each other. The right-handed polarized signal and left-handed polarized signal are received respectively by antenna probes 113 and 114 to be supplied to an LNA (Low-Noise Amplifier) 130.

LNA 130 includes two amplifiers 131 and 132, a synthesizing circuit 133 and a gain amplifier 134. The right-handed signal is supplied to amplifier 131 while the left-handed signal is supplied to amplifier 132 and these signals are accordingly amplified, with low noise. Whether the left-handed signal or the right-handed signal is received, a power supply and switch control IC 140 switches on/off amplifiers 131 and 132. The right-handed signal output from amplifier 131 or the left-handed signal output from amplifier 132 is supplied from synthesizing circuit 133 via gain amplifier 134 to a BPF (Bandpass Filter) 135 where signal components (frequencies) in the image freqency band are eliminated. The received signal is then supplied to a mixer (MIX) 136.

A local oscillator circuit (Local) 137 generates a local oscillator signal of 11.25 GHz which is supplied to mixer 136. Mixer 136 mixes the received signal of 12.2–12.7 GHz with the local oscillator signal of 11.25 GHz in order to convert the received signal into an intermediate-frequency (IF) signal of 950–1450 MHz. The IF signal is then supplied to an IF amplifier (AMP.) 138. IF amplifier 138 having appropriate noise and gain characteristics amplifies the IF signal which is provided from an output terminal 139. A receiver, i.e., a television receiver is connected to output terminal 139 to receive only one of an odd-numbered channel and an even-numbered channel.

As discussed above, the two-input one-output LNB as shown in FIG. 10 is configured simply and at low cost, while only one of broadcast programs transmitted respectively by the right-handed signal and the left-handed signal can be received. In order to allow two broadcast programs transmitted respectively by a right-handed signal and a left-handed signal to be received simultaneously by different TV receivers, the two-input two-output LNB as shown in FIG. 11 should be employed.

Referring to FIG. 11, the incoming signal of 12.2–12.7 GHz received by antenna 101 in FIG. 9 is divided into a right-handed polarized signal and a left-handed polarized signal by a phase plate 112 within an input waveguide 111. The resultant right-handed polarized signal and left-handed polarized signal are respectively received by antenna probes 113 and 114 and supplied to LNAs 115 and 116 where the signals are amplified with low noise, and desired frequency components are supplied to BPFs 117 and 118 where signal components of the image frequency band are eliminated. The received signals are thereafter supplied to mixers 119 and 120.

A local oscillator circuit 121 generates a local oscillator signal of 11.25 GHz which is divided by a divider circuit 141 into two outputs with the one supplied via a blocking filter 129 to mixer 119 and the other one supplied via a blocking filter 128 to mixer 120. Blocking filters 129 and 128 block out any opposite polarization signals to prevent interference of received signals with each other and accordingly ensure isolation, which provides enhanced cross-polarization characteristics of these polarized signals. Mixers 119 and 120 mix received signals of 12.2–12.7 GHz with the local oscillator signal of 11.25 GHz so as to convert the received signals into intermediate frequency (IF) signals of 950–1450 MHz.

Respective IF signals output from mixers 119 and 120 are supplied to a switch circuit 122. Switch circuit 122 is controlled by a power supply and switch control IC 127 to supply respective outputs of mixers 119 and 120 to IF amplifiers 123 and 124. IF amplifiers 123 and 124 having appropriate noise and gain characteristics amplify respective IF signals, and resultant signals are supplied from output terminals 125 and 126 respectively. TV receivers are connected respectively to output terminals 125 and 126 to receive different broadcast programs simultaneously.

For such a downconverter with multiple inputs and multiple outputs as the two-input two-output LNB as shown in FIG. 11, it is necessary that required signals are transmitted respectively to a plurality of receivers. Then, the right-handed and left-handed polarized signals must be ready for output all the time and LNAs 115 and 116 and mixers 119 and 120 must always be in the driven state. Accordingly, the power of the local oscillator signal which is output from local oscillator 121 must be divided equally by divider circuit 141 into two outputs to be supplied respectively to two mixers 119 and 120.

Divider circuit 141 may be a Y-branch divider (Wilkinson coupler with the Y-shaped branch) as shown in FIG. 12. Y-branch divider 150 includes a port 1 connected to local oscillator 121, a port 2 connected to mixer 119 and a port 3 connected to mixer 120. For respective sections between port 1 and port 2 and between port 2 and port 3, a characteristic impedance of $\sqrt{2}\cdot Zo$ and a length of $\lambda g/4$ ($\lambda g$: effective wavelength) are selected. A chip resistor with an impedance of 2Zo is connected between port 2 and port 3.

Y-branch divider 150 shown in FIG. 12 divides the local oscillator signal from local oscillator circuit 121 into two outputs to be supplied to two mixers 119 and 120, while lines respectively for right-handed and left-handed polarized signals extending from mixers 119 and 120 are connected via Y branch divider 150.

FIG. 13 shows pass characteristics from port 1 to port 2 as well as isolation characteristics from port 3 to port 2 of Y-branch divider 150. Similarly, FIG. 14 shows pass characteristics from port 1 to port 3 as well as isolation characteristics from port 2 to port 3. It is seen from FIGS. 13 and 14 that the isolation characteristics between port 2 and port 3 are deteriorated where the frequency is different from the center frequency. As Y-branch divider 150 has the narrow-band isolation characteristics and isolation is deteriorated at any frequency even slightly different from the frequency of 17.5 GHz, the right-handed and left-handed polarized signals each could leak to the opposite polarization which causes interference of the signals.

Then as shown in FIG. 11, the opposite polarization signals are blocked out by block filters 129 and 128 at the outputs of divider circuit 141 in order to ensure isolation of the right-handed and left-handed polarized signals. However, block filters 129 and 128 in a circuit for processing high frequencies are constituted by using microstrip lines, resulting in a disadvantage that the circuit size could increase. In order to overcome this disadvantage, any trap circuit is actually employed for the blocking. However, with regard to this trap circuit, trapped frequencies are significantly different depending on the length and there is a great influence of matching with respect to mixers 119 and 120. In order to achieve a stable circuit configuration by using the trap circuit, some technical knowledge is indispensable.

SUMMARY OF THE INVENTION

One object of the present invention is to provide a local oscillator signal divider and a low-noise converter employing this local oscillator signal divider, achieving stable performance and high isolation with little influence of matching with respect to mixers, without increase in the circuit scale.

In summary, the present invention according to one aspect is a local oscillator signal divider dividing a local oscillator signal into at least two branch signals to be output. The local oscillator signal divider includes a first rat race circuit dividing the local oscillator signal into branch signals to be output.

The first rat race circuit includes a first annular transmission line, a first input port, and first and second output ports.

The first input port receiving the local oscillator signal is connected to a first node on the first annular transmission line. The first output port is connected to a second node on the first annular transmission line, the second node distant from the first node in a first direction by a predetermined distance. The second output port is connected to a third node on the first annular transmission line, the third node distant from the first node in a direction opposite to the first direction by the predetermined distance.

The present invention according to another aspect is a low-noise converter receiving a first polarized signal and a second polarized signal and converting the first and second polarized signals respectively into intermediate-frequency signals. The converter includes first and second circuits, a local oscillator circuit, a rat race circuit, first and second mixer circuits, and a switch circuit.

The first circuit outputs the first polarized signal. The second circuit outputs the second polarized signal. The local oscillator circuit outputs a local oscillator signal. The rat race circuit divides the local oscillator signal into branch signals to be output.

The rat race circuit includes an annular transmission line, an input port, and first and second output ports.

The input port receiving the local oscillator signal is connected to a first node on the annular transmission line. The first output port is connected to a second node on the annular transmission line, the second node distant from the first node in a first direction by a predetermined distance. The second output port is connected to a third node on the annular transmission line, the third node distant from the first node in a direction opposite to the first direction by the predetermined distance.

The first mixer circuit mixes the first polarized signal supplied from the first circuit with the local oscillator signal supplied from the first output port to output a first intermediate-frequency signal.

The second mixer circuit mixes the second polarized signal supplied from the second circuit with the local oscillator signal supplied from the second output port to output a second intermediate-frequency signal.

The switch circuit selectively outputs one of the first and second intermediate-frequency signals.

The present invention according to a further aspect is a low-noise converter receiving first to fourth polarized signals to convert the first to fourth polarized signals respectively into intermediate-frequency signals. The converter includes first to fourth circuits, a local oscillator circuit, first to third rat race circuits, first to fourth mixer circuits, and a switch circuit.

The first to fourth circuits output the first to fourth polarized signals respectively. The local oscillator circuit outputs a local oscillator signal. The first rat race circuit receives and divides the local oscillator signal into two first branch signals to be output. The second rat race circuit is provided correspondingly to the first and second circuits to divide one of the first branch signals output from the first rat race circuit into two second branch signals to be output. The third rat race circuit is provided correspondingly to the third and fourth circuits to divide the other of the first branch signals output from the first rat race circuit into two third branch signals to be output.

The first to third rat race circuits each include an annular transmission line, an input port, and first and second output ports. The input port is connected to a first node on the annular transmission line. The first output port is connected to a second node on the annular transmission line, the second node distant from the first node in a first direction by a predetermined distance. The second output port is connected to a third node on the annular transmission line, the third node distant from the first node in a direction opposite to the first direction by the predetermined distance.

The first mixer circuit mixes the first polarized signal supplied from the first circuit with one output of the second rat race circuit to output a first intermediate-frequency signal. The second mixer circuit mixes the second polarized signal supplied from the second circuit with the other output of the second rat race circuit to output a second intermediate-frequency signal. The third mixer circuit mixes the third polarized signal supplied from the third circuit with one output of the third rat race circuit to output a third intermediate-frequency signal. The fourth mixer circuit mixes the fourth polarized signal supplied from the fourth circuit with the other output of the third rat race circuit to output a fourth intermediate-frequency signal. The switch circuit selectively outputs some of the first to fourth intermediate-frequency signals.

Accordingly, a chief advantage of the present invention is that, as the rat race circuit divides the local oscillator signal, the local oscillator signal can be divided with high isolation.

Another advantage of the present invention is that the low-noise converter is achieved, with little influence of matching with respect to mixers, providing stable performance and high isolation, without increase in the circuit size.

Still another advantage is that the low-noise converter of multi-input two-output is achieved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
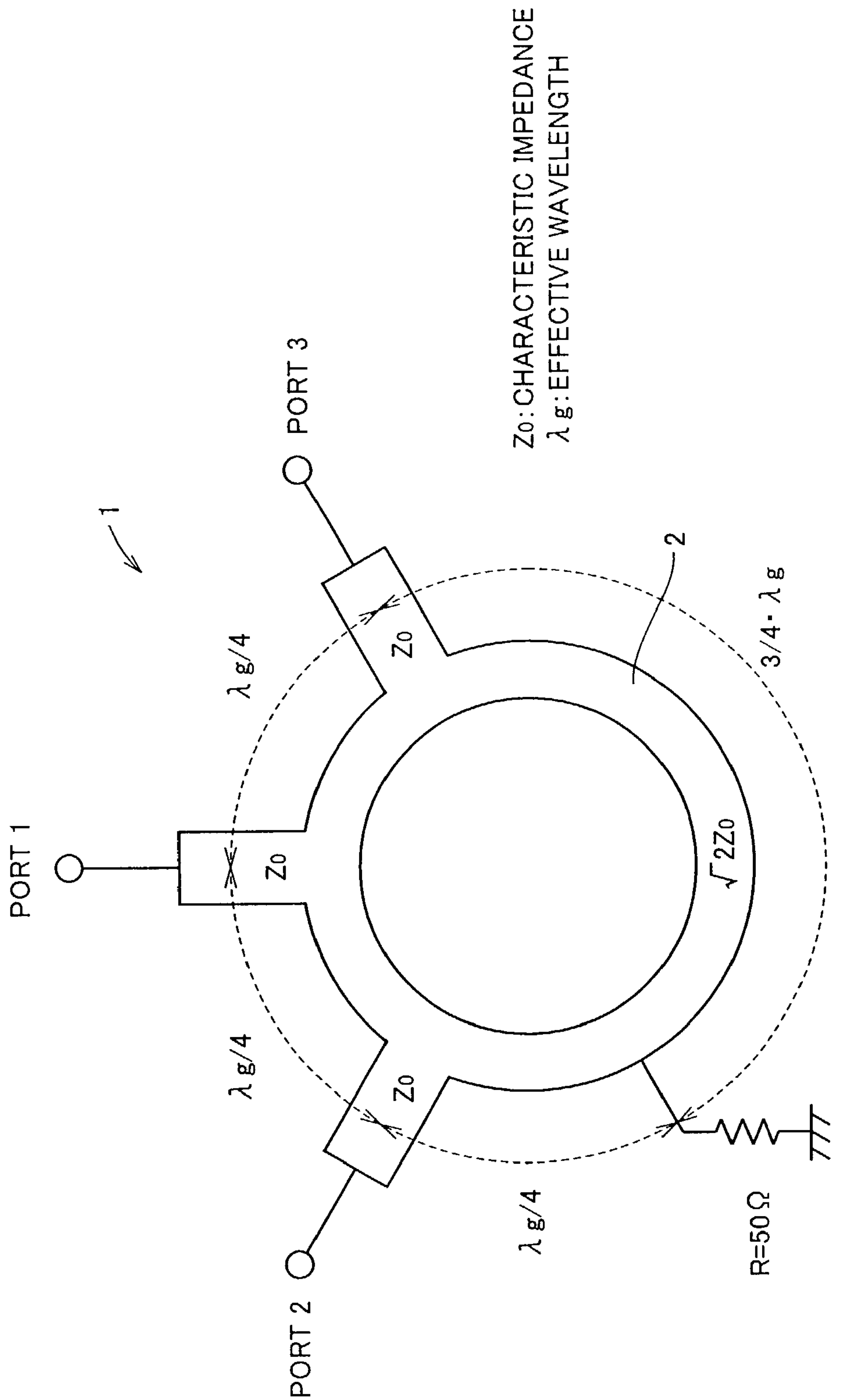
FIG. 1 shows a rat race circuit as one example of dividers according to a first embodiment of the present invention.

FIG. 1 shows a rat race circuit as one example of dividers according to a first embodiment of the present invention. Referring to FIG. 1, an annular transmission line 2 which is a main part of rat race circuit 1 is formed on a microstrip dielectric substrate. The thickness of the substrate is, for example, 0.6 mm. On the entire back of the microstrip dielectric substrate, a ground electrode is formed. At any arbitrary position of annular transmission line 2, a terminal for a port 1 is formed. Respective terminals for port 2 and port 3 are formed at respective positions that are distant from the position of port 1 in the counter-clockwise direction and the clockwise direction each by a distance of $\lambda g/4$ ($\lambda g$: effective wavelength). For ports 1, 2 and 3, a characteristic impedance of Zo is selected. Further, a terminal for resistor ($R=50\Omega$) is connected to the position distant from port 2 in the counter-clockwise direction by the distance of $\lambda g/4$, for preventing reflection. The distance between terminal for resistor R and port 3 is $3/4 \cdot \lambda g$ and a characteristic impedance of $\sqrt{2} \cdot Zo$ is selected for the section therebetween.

A local oscillator signal is supplied to port 1, an input of a first mixer is connected to port 2, and an input of a second mixer is connected to port 3. The signal from port 2 travels ¼ wavelength in the clockwise direction to reach port 1. The signal from port 2 travels 5/4 wavelength in the counter-clockwise direction to reach port 1. The phase difference of the signals thus corresponds to one wavelength. Signals arrive at port 1 are in phase, and combined to be output to port 1.

The signal from port 2 travels ½ wavelength through the clockwise path to reach port 3, and the signal from port 2 travels 1 wavelength through the counterclockwise path to reach port 3. Then, these signals are out of phase by ½ wavelength, and accordingly the signals of opposite phases cancel each other. Consequently, no signal is output to port 3.

Similarly, the signals from port 3 to port 1 are in phase, and combined to be output, and the signals form port 3 to port 2 cancel each other because these signals are in opposite phases.

In this way, signals from port 2 and port 3 are output to port 1 while respective signals from port 2 and port 3 are not output to port 3 and port 2 respectively. Here, if the signals of ports 2 and 3 are of the same phase and the same amplitude, the combined signal is output to port 1 that is twice the wavelength of the input signal. In other words, this circuit equally divides the signal from port 1 into signals to be output to port 2 and port 3, and no signal leakage occurs between port 2 and port 3.

Figure 2:
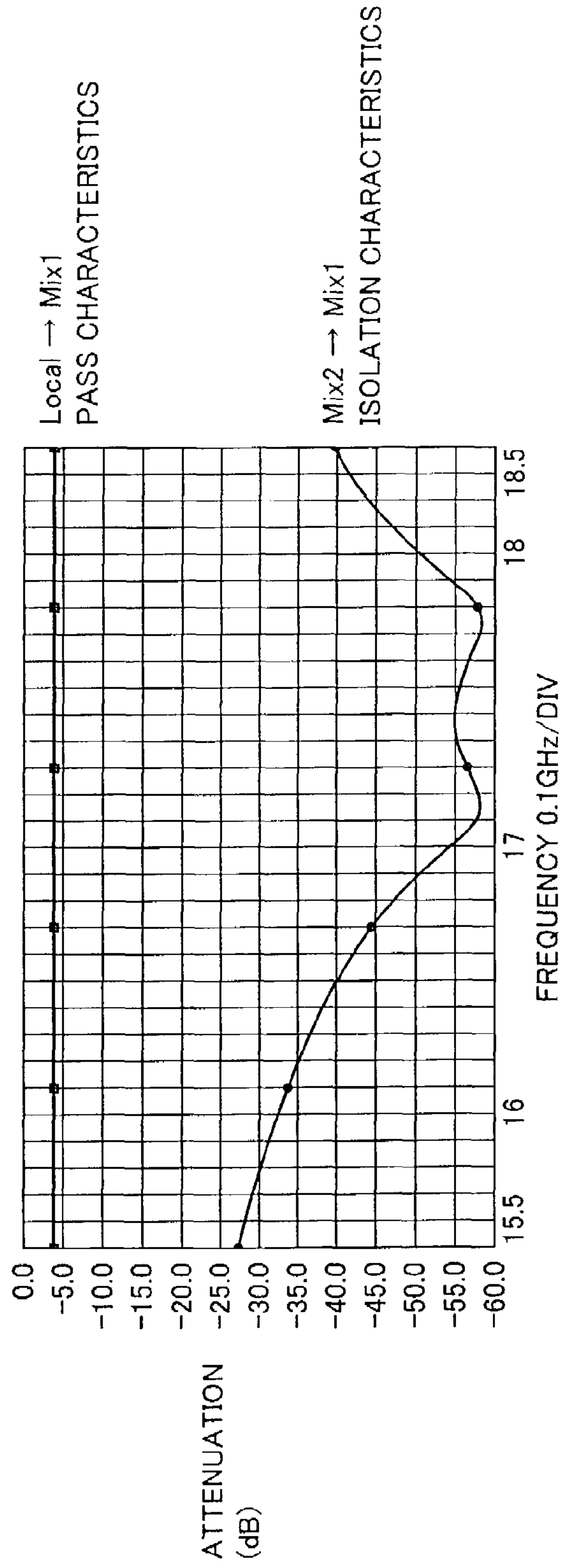
FIG. 2 shows pass characteristics from port 1 to port 2 as well as isolation characteristics from port 3 to port 2 of the rat race circuit shown in FIG. 1.
Figure 3:
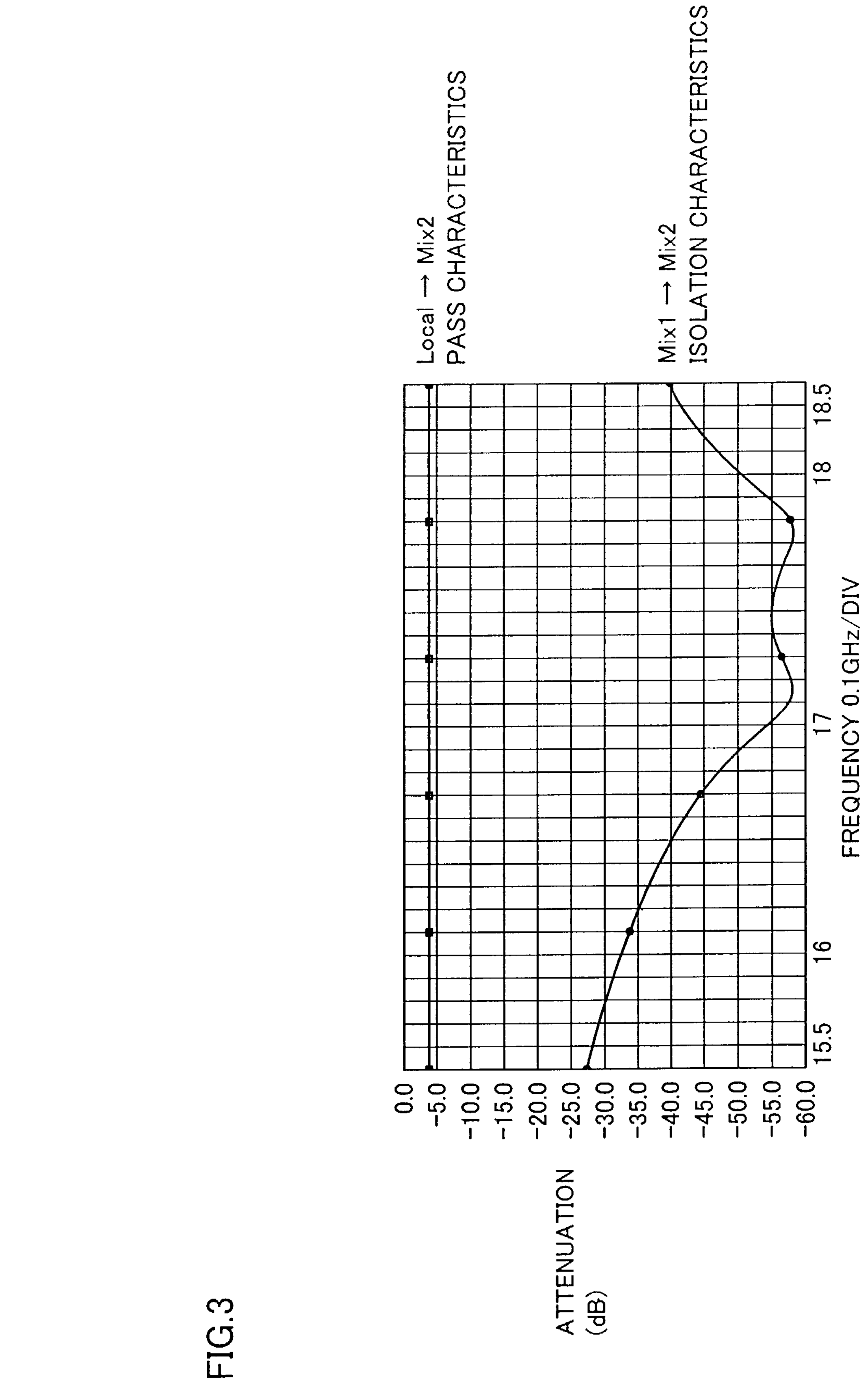
FIG. 3 shows pass characteristics from port 1 to port 3 as well as isolation characteristics from port 2 to port 3 of the rat race circuit shown in FIG. 1.

FIGS. 2 and 3 show pass characteristics and isolation characteristics of the rat race circuit shown in FIG. 1, the characteristics being obtained through simulation. It is noted that the frequency range here is 17.3–17.7 GHz for an LNB adapted to receive K band.

Figure 12:
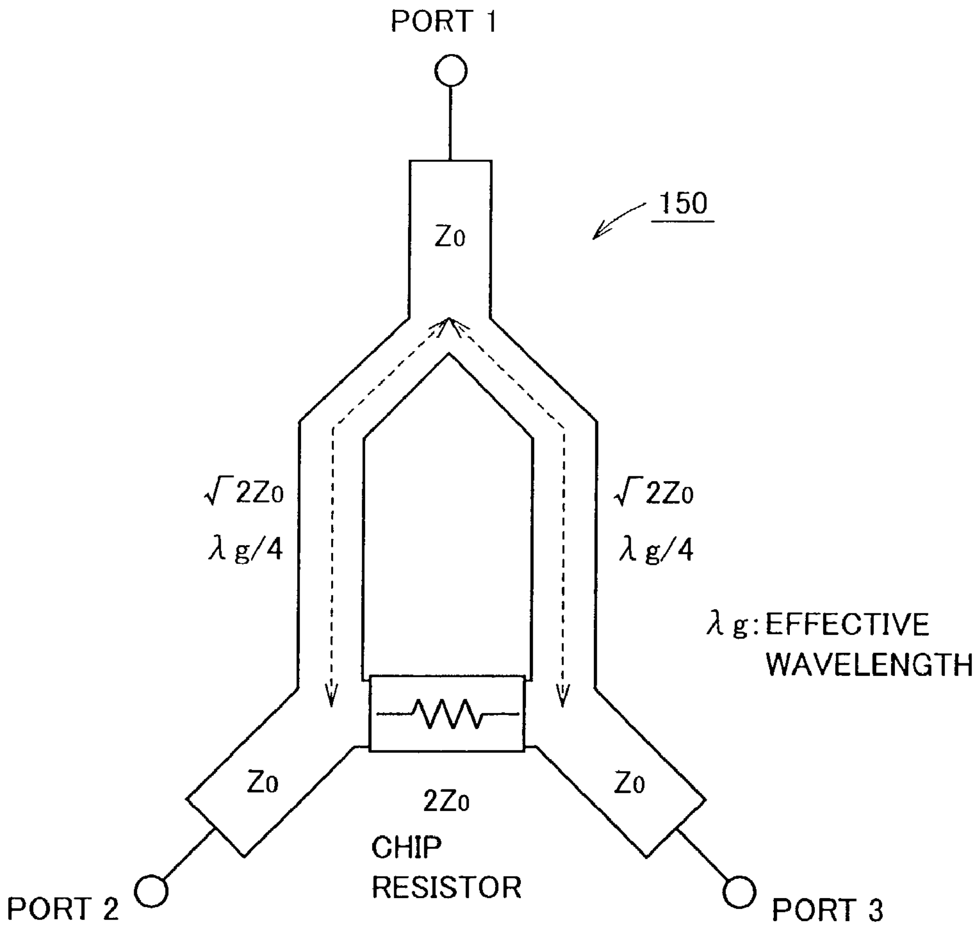
FIG.12 PRIOR ART
FIG. 12 shows a conventional Y-branch divider.
Figure 13:
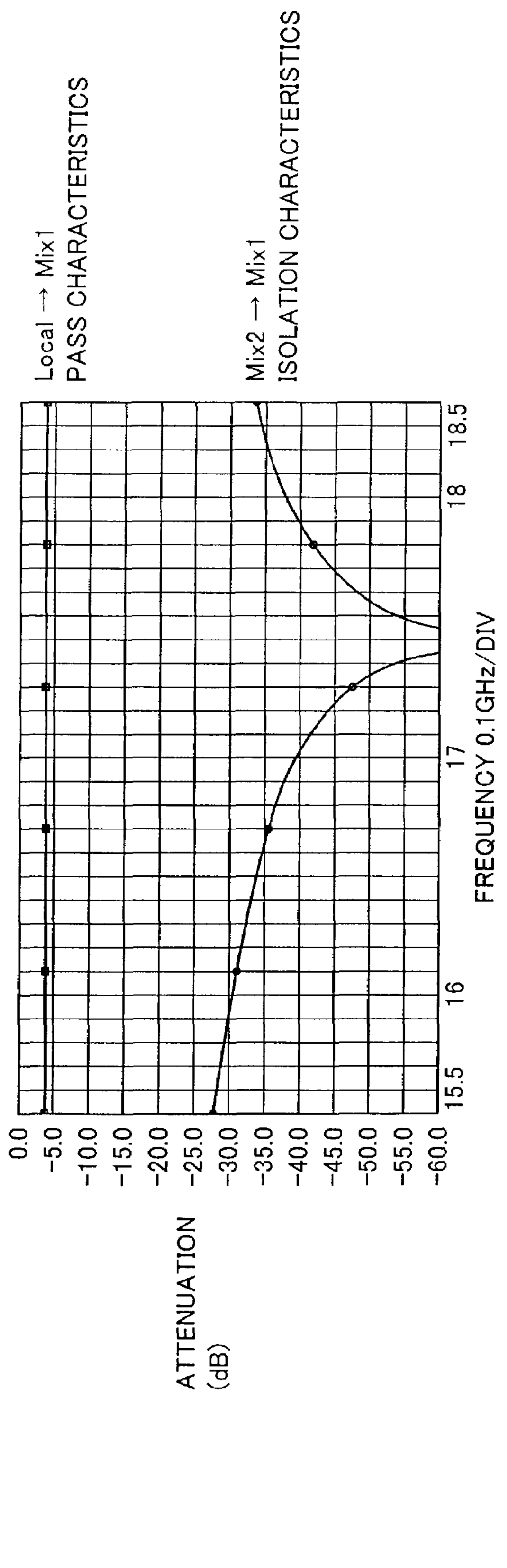
FIG.13 PRIOR ART
FIG. 13 shows pass characteristics from port 1 to port 2 and isolation characteristics from port 3 to port 2 of the Y-branch divider.
Figure 14:
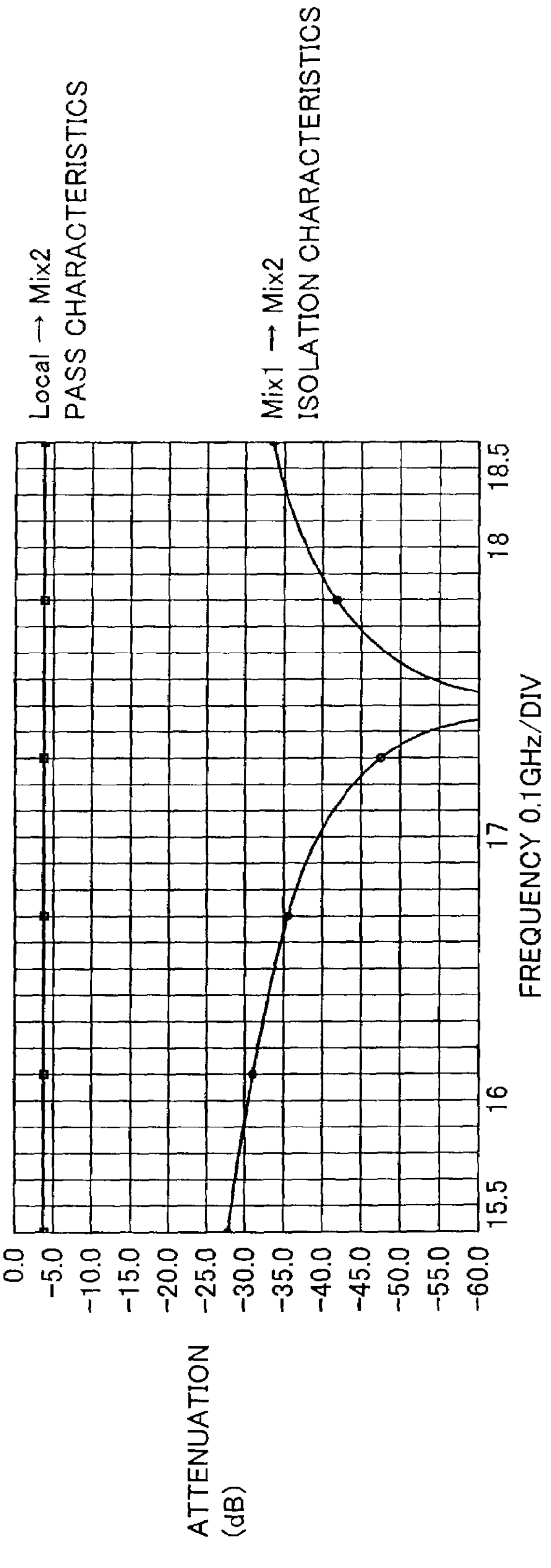
FIG.14 PRIOR ART
FIG. 14 shows pass characteristics from port 1 to port 3 and isolation characteristics from port 2 to port 3 of the Y-branch divider.

It is seen from the pass characteristics from port 1 to port 2 shown in FIG. 2 that the loss is considerably small, and it is also seen from the isolation characteristics from port 3 to port 2 that the isolation characteristics here provide high isolation of a wide band compared with the isolation characteristics of the conventional Y-branch divider circuit as shown in FIG. 13. In addition, it is seen from the pass characteristics from port 1 to port 3 shown in FIG. 3 that the loss is considerably small and, it is also seen from the isolation characteristics, high isolation of a broadband is achieved as compared with the isolation characteristics shown in FIG. 14 of the conventional Y-branch divider circuit shown in FIG. 12.

Figure 4:
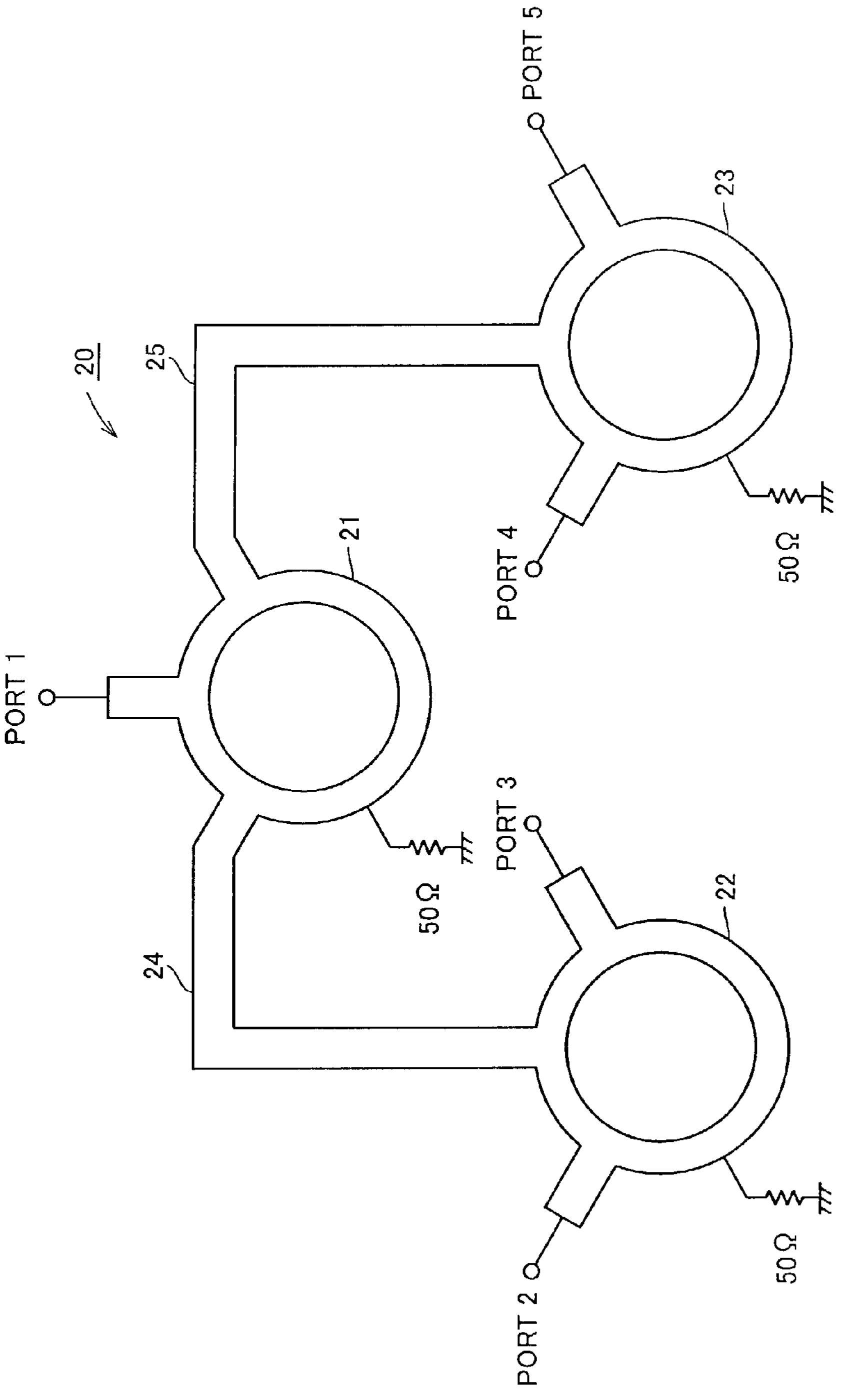
FIGS. 4–6 show respective rat race circuits according to second to fourth embodiments of the present invention.

FIG. 4 shows a rat race circuit according to a second embodiment of the present invention. According to this embodiment, three rat race circuits are used to constitute a four-branch divider circuit. Specifically, on a microstrip dielectric substrate, three annular transmission lines 21, 22 and 23 are formed. The first-stage rat race circuit, i.e., annular transmission line 21 and one of the second-stage rat race circuits, i.e., annular transmission line 22 are coupled by a strip-like transmission line 24 which connects the position of annular transmission line 21 that is distant from port 1 by λg/4 in the counter-clockwise direction and any arbitrary position of annular transmission line 22. Port 2 is formed at a distance of λg/4 in the counter-clockwise direction from the position where the transmission line 24 is connected, and port 3 is formed at a distance of λg/4 in the clockwise direction.

Moreover, the position at a distance of λg/4 in the clockwise direction from port 1 of annular transmission line 21 and an arbitrary position of the other second-stage rat race circuit, i.e., annular transmission line 23 are connected by a transmission line 25. Port 4 is formed at a distance of λg/4 in the counter-clockwise direction from the position of transmission line 23 connected to transmission line 25. Port 5 is formed at a distance of λg/4 in the clockwise direction from the position connected to transmission line 25. A terminal for resistor of 50Ω is connected to the position at a distance of λg/4 in the counter-clockwise direction from the position where the transmission line 24 is connected to the annular transmission line 21, a terminal for resistor of 50Ω is connected to the position at a distance of λg/4 in the counter clockwise direction from port 2 of annular transmission line 2, and a terminal for resistor of 50Ω is connected to the position at a distance of λg/4 in the counter-clockwise direction from port 4 of annular transmission line 23.

In this way, the rat race circuits are connected in series to constitute the four-branch circuit. This circuit exhibits excellent characteristics regarding isolation between ports 1 to 5. A local oscillator signal supplied to port 1 is equally divided into outputs to be supplied to ports 1, 2, 3 and 4 respectively.

It is noted that further rat race circuits may be connected in series to the embodiment shown in FIG. 4 to constitute equal dividers of multiple outputs, such as 8-branch and 16-branch dividers.

Figure 5:
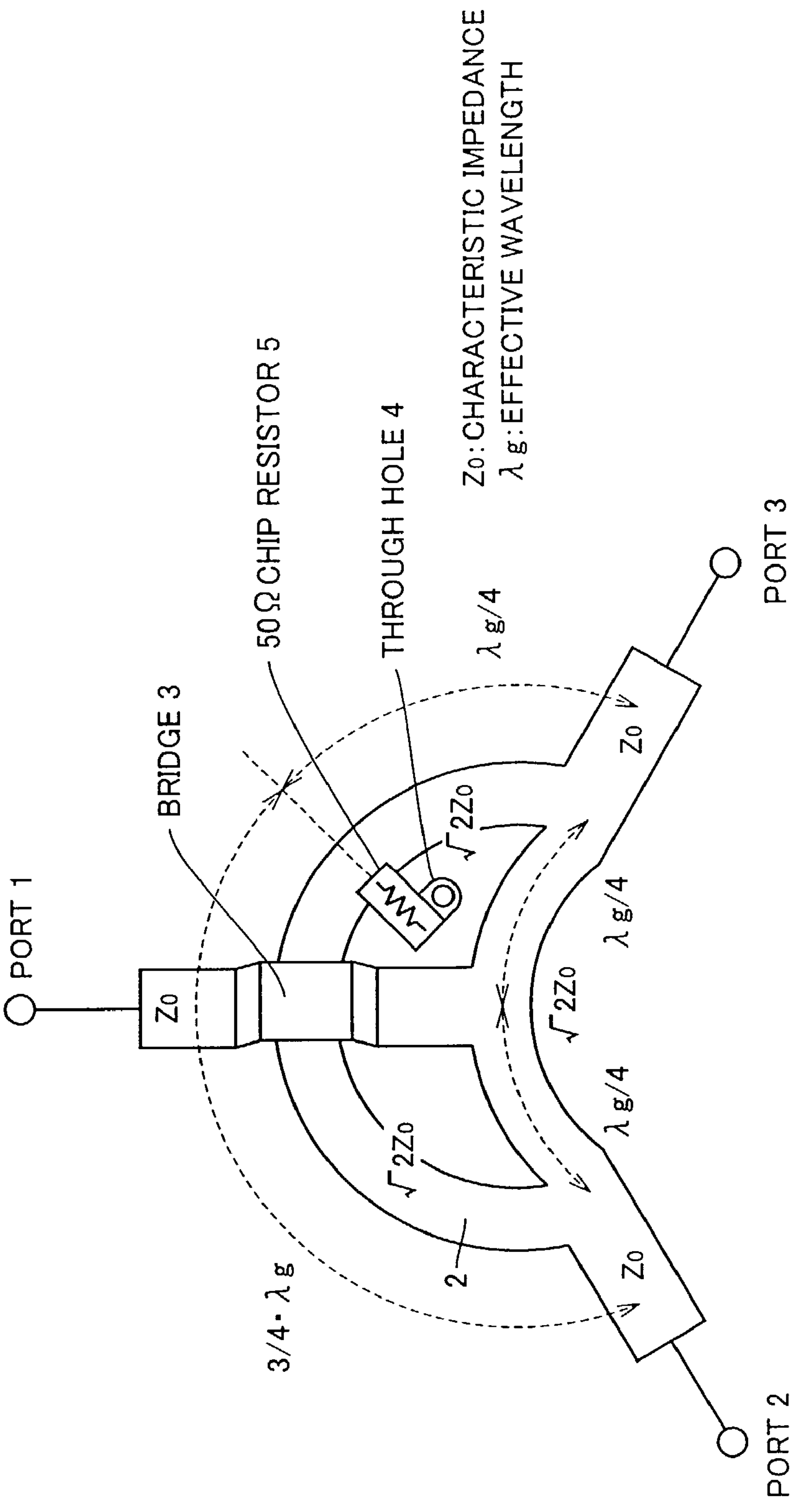

FIG. 5 shows a third embodiment of the present invention. The circuit shown in FIG. 5 is reduced in size relative to the rat race circuit shown in FIG. 1. Specifically, annular transmission line 2 of the rat race circuit shown in FIG. 1 is folded back (inward) at a distance of λg/4 in the clockwise direction and at a distance of λg/4 in the counter-clockwise direction from the position of port 1 (λg: effective wavelength). Here, port 1 has a bridge 3 formed to cross over a part of annular transmission line 2 that has a length of ¾ λg. Specifically, this rat race circuit may be produced by providing an additional substrate on the substrate where annular transmission line 2 is formed and forming bridge 3 on the additional substrate.

A chip resistor 5 of 50Ω is used as terminal for resistor R having one end connected to annular transmission line 2 and the other end connected to the ground electrode formed on the entire back of the substrate by a through hole 4. In this way, annular transmission line 2 is partially folded back to reduce the size of the circuit.

Figure 6:
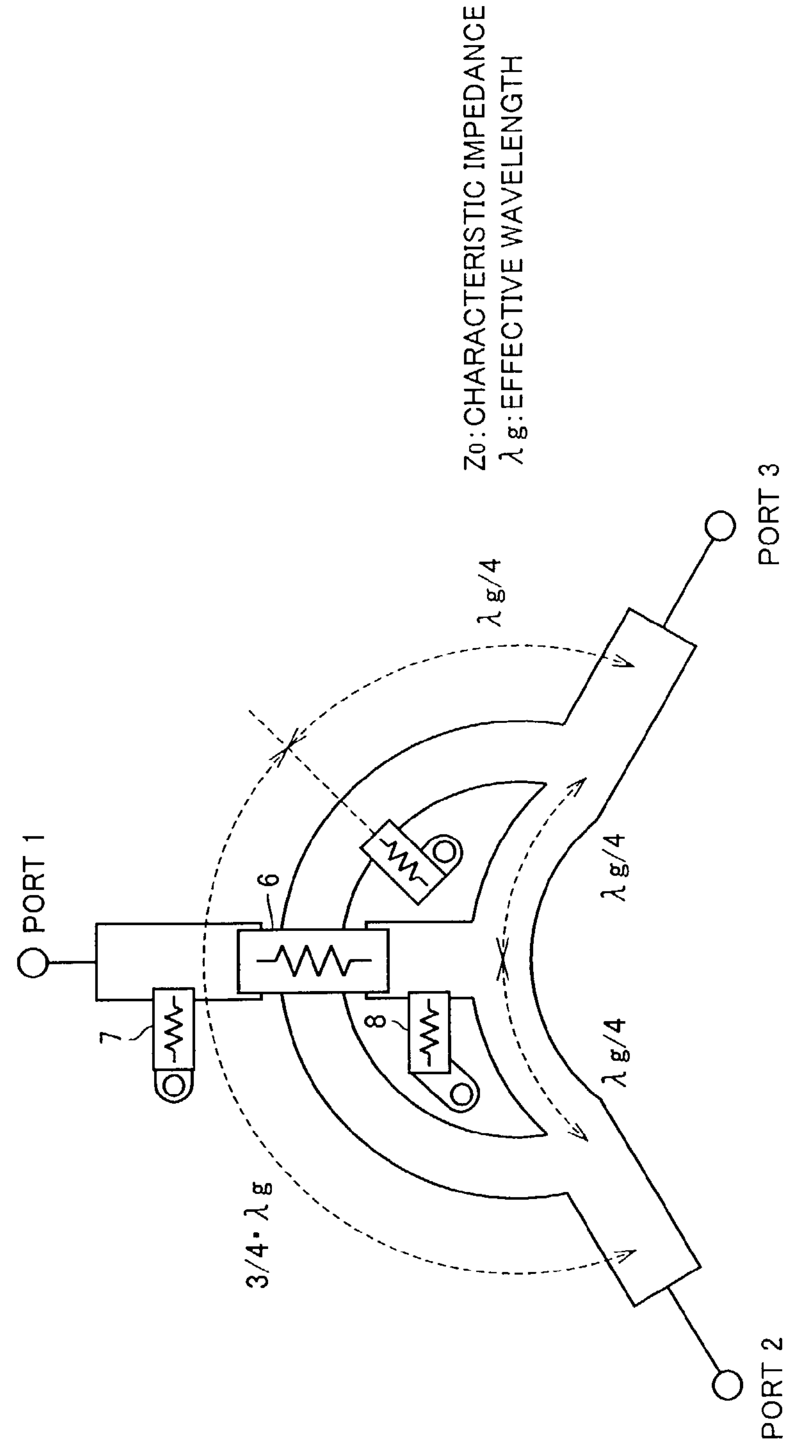

FIG. 6 shows a fourth embodiment of the present invention. According to the fourth embodiment, instead of bridge 3 used for folded-back annular transmission line 2 of the embodiment shown in FIG. 5, a chip resistor 6 is connected. Chip resistor 6, a chip resistor 7 connected between port 1 and the ground and a chip resistor 8 connected between annular transmission line 2 and the ground constitute an attenuator of π type. This π-type attenuator reduces influences of variation in the load on the local oscillator circuit, and this attenuator may be of T type instead of π type. The ground terminals of chip resistors 7 and 8 are connected by through holes to the ground electrode formed on the entire back of the substrate.

Figure 7:
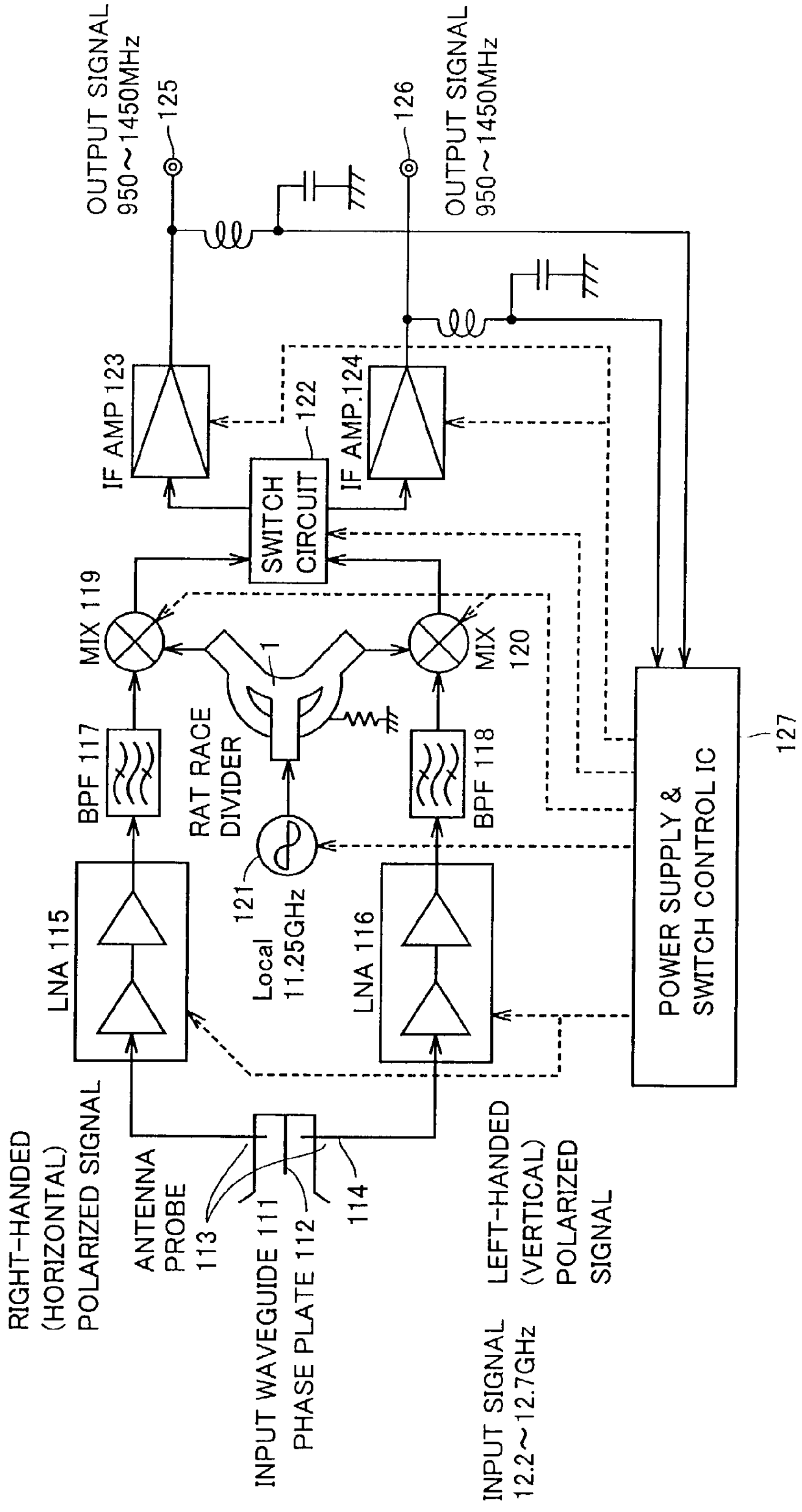
FIG. 7 is a block diagram of an LNB employing a rat race circuit of the present invention.
Figure 11:
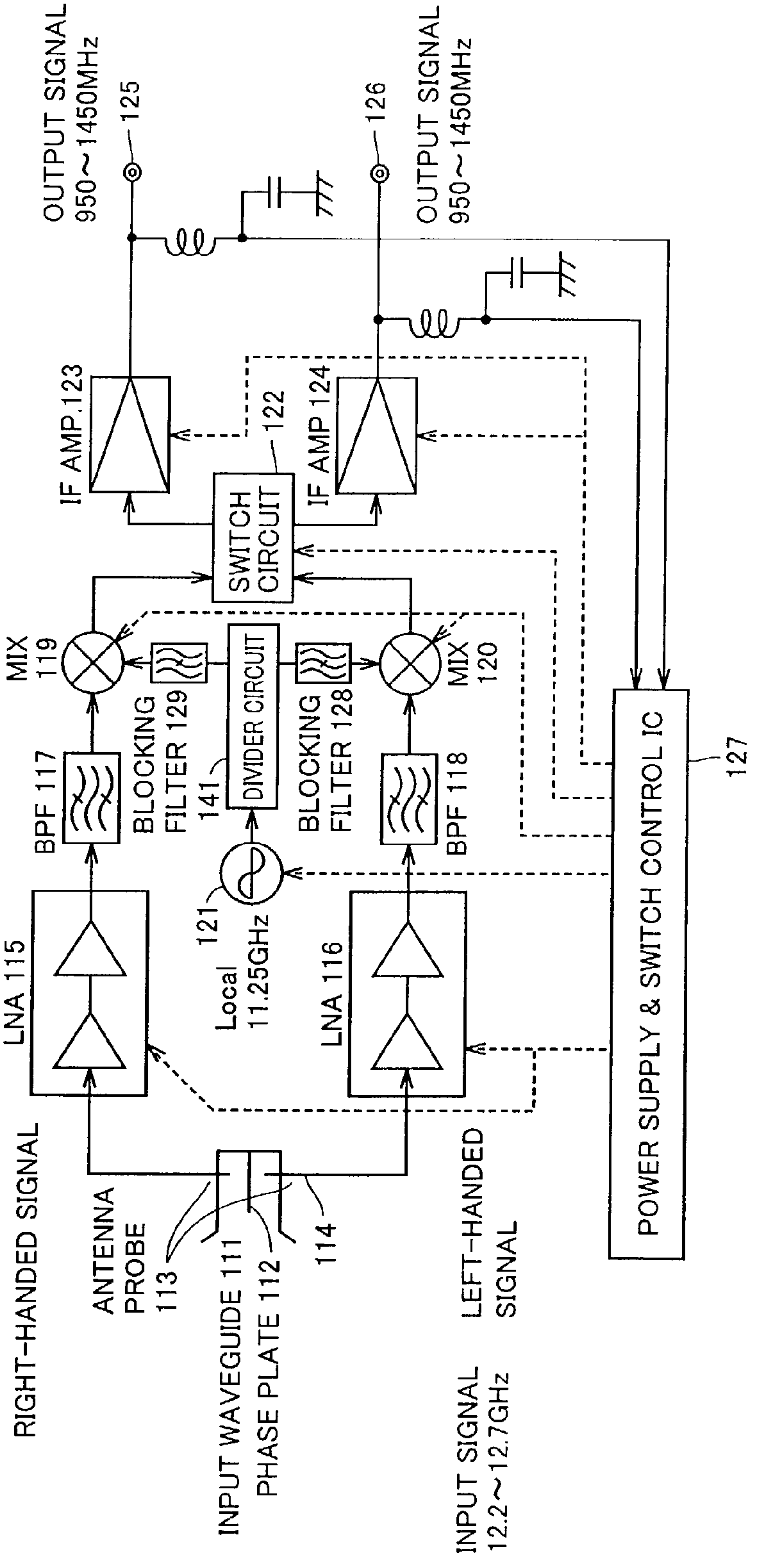
FIG.11 PRIOR ART
FIG. 11 is a block diagram of a two-(polarized wave) input two-output LNB.

FIG. 7 is a block diagram of an LNB using a rat race circuit of the present invention. This embodiment as shown in FIG. 7 is similar in the configuration to that shown in FIG. 1 except that rat race circuit 1 shown in FIG. 1 is employed as divider circuit 141 of the LNB shown in FIG. 11. A local oscillator signal from a local oscillator circuit 121 is supplied to port 1 of rat race circuit 1, port 2 is connected to an input of a mixer 119 and port 3 is connected to an input of a mixer 120. The local oscillator signal from local oscillator circuit 121 is thus divided into two outputs to be supplied to mixers 119 and 120 respectively. Here, rat race circuit 1 has low-loss pass characteristics and wide-band isolation characteristics as shown in FIGS. 2 and 3, which means there occurs smaller leakage between mixers 119 and 120 and accordingly the LNB with cross-polarization characteristics is achieved. It is noted that the present invention is directly applicable to systems receiving horizontally and vertically polarized signals instead of the right-handed and left-handed polarized signals.

Figure 8:
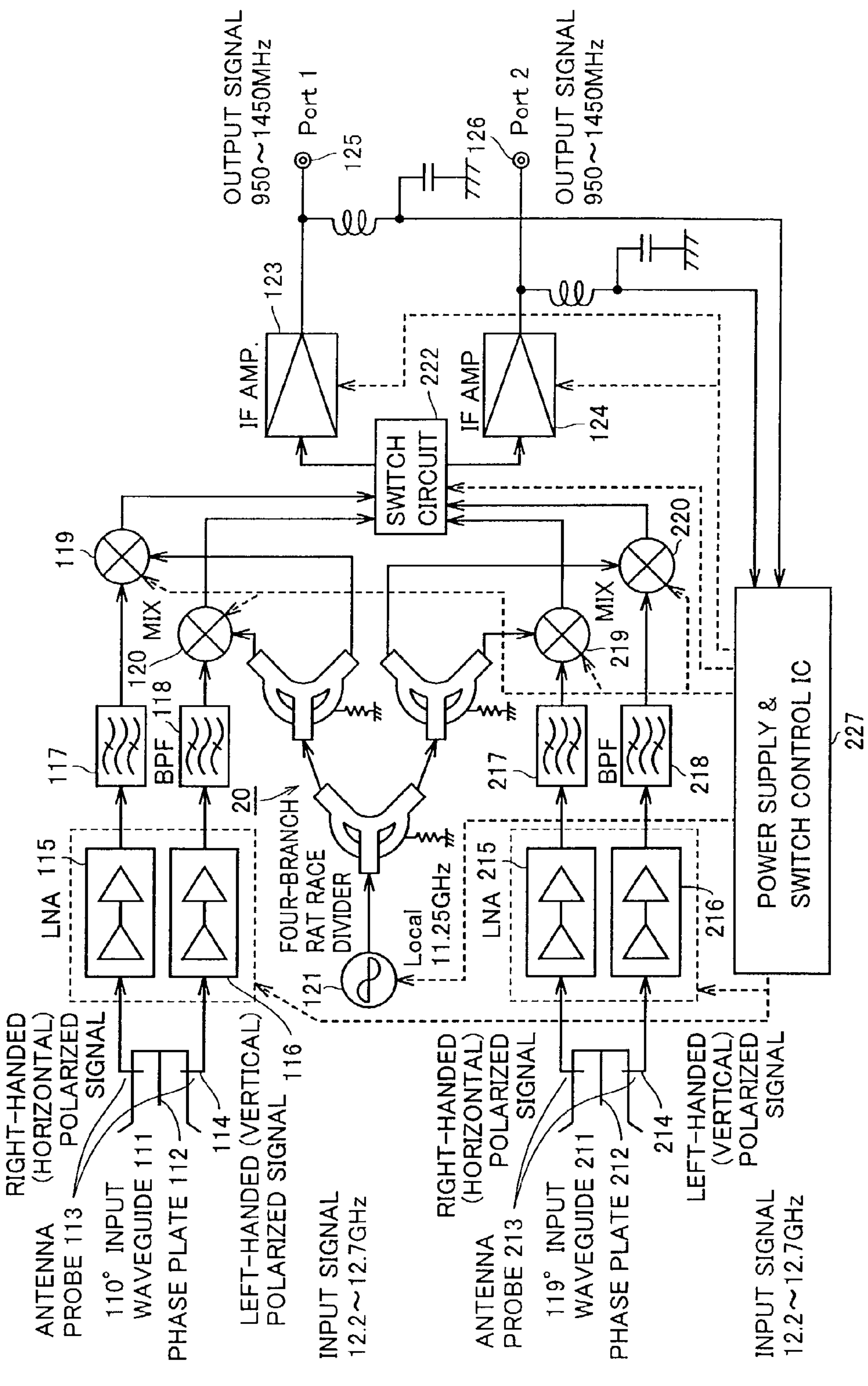
FIG. 8 is a block diagram of an LNB employing a four-branch rat race circuit of the present invention.
Figure 9:
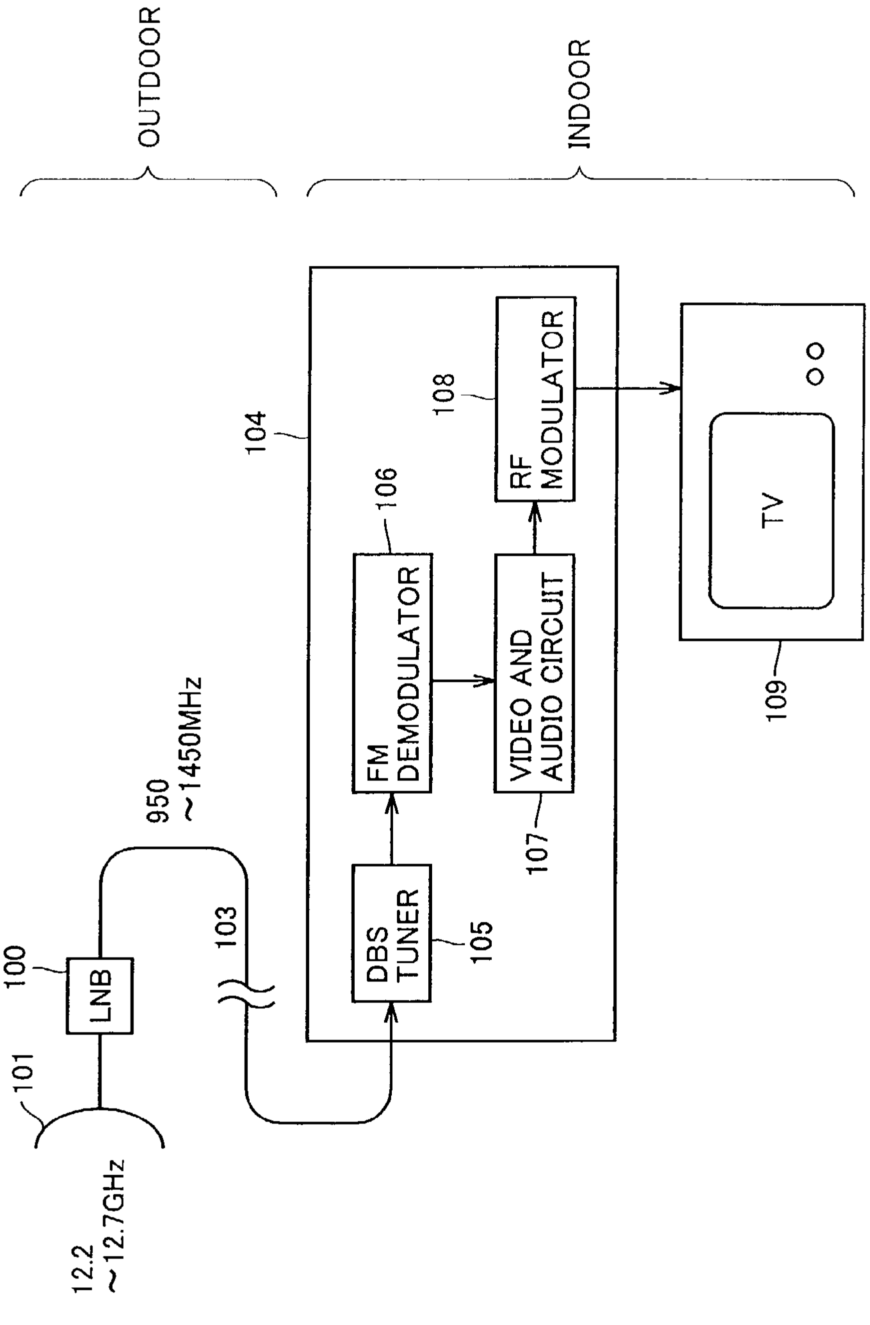
FIG.9 PRIOR ART
FIG. 9 is a block diagram schematically showing a conventional and typical satellite broadcasting receiving system.
Figure 10:
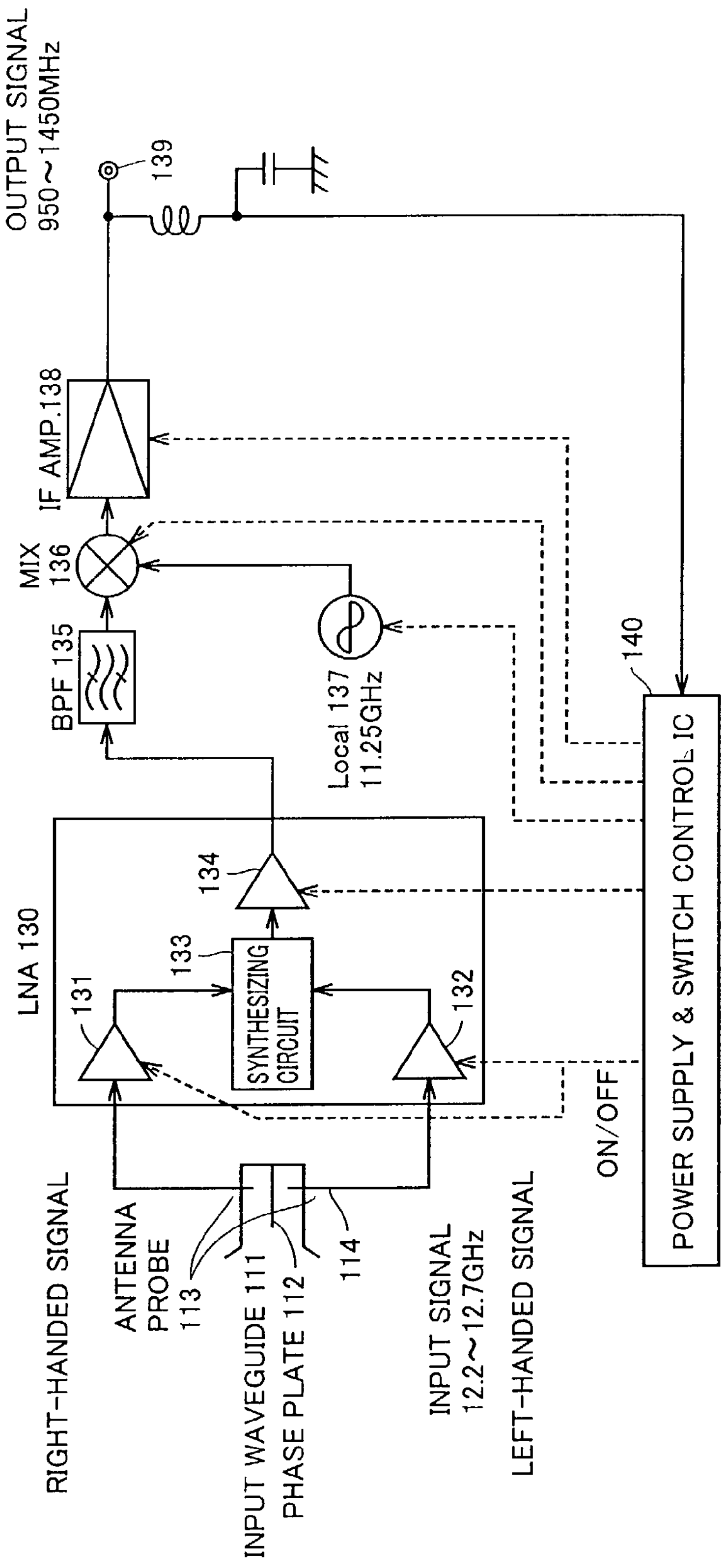
FIG.10 PRIOR ART
FIG. 10 is a block diagram of a two-(polarized wave) input one-output LNB.

FIG. 8 is a block diagram of an LNB employing a four-branch rat race divider. Referring to FIG. 8, in addition to a set of components shown in FIG. 7 that are input waveguide 111, phase plate 112, antenna probes 113 and 114, LNAs 115 and 116, BPFs 117 and 118, and mixers 119 and 120, another similar set of components are provided that are an input waveguide 211, a phase plate 212, antenna probes 213 and 214, LNAs 215 and 216, BPFs 217 and 218, and mixers 219 and 220.

This four-branch rat race divider 20 has annular transmission lines 21, 22 and 23 as shown in FIG. 4 that are folded back as shown in FIG. 6. A local oscillator signal is provided from local oscillator circuit 121 to the rat race circuit of the first stage. One of the rat race circuits of the second stage divides the local oscillator signal into two outputs which are supplied to one set of mixers 119 and 120. The local oscillator signal is also divided into two outputs by the other rat race circuit of the second stage and supplied to another set of mixers 219 and 220. Mixers 119 and 120 mix respective right-handed and left-handed polarized signals from LNAs 115 and 116 and BPFs 117 and 118 with the local oscillator signal to generate and output respective intermediate-frequency signals. The intermediate-frequency signals are supplied to switch circuit 222 which selects and outputs one of the signals. Similarly, mixers 219 and 220 mix respective right-handed and left-handed polarized signals with the local oscillator signal to generate and output respective intermediate-frequency signals. The intermediate-frequency signals are supplied to switch circuit 222 which selects and outputs one of them. The intermediate-frequency signals selected by switch circuit 122 are amplified by IF amplifiers 123 and 124 and output from output terminals 125 and 126.

According to this embodiment, four-branch rat race divider 20 can be used to achieve the LNB having superior cross-polarization characteristics even if there are four inputs for polarized signals. It is noted that the configuration as shown in FIG. 8 is also directly applicable to an LNB receiving horizontally and vertically polarized signals instead of the right-handed and left-handed polarized signals.

As heretofore discussed, according to the present invention, the local oscillator signal is supplied to any input port of the annular transmission line, and the local oscillator signal is split into signals to be supplied from respective output ports distant from the input port in the clockwise and counter-clockwise directions respectively each by a predetermined distance. The local oscillator signal can thus be divided with high isolation.

Moreover, the received right-handed (horizontal) polarized signal is supplied from a first circuit and the received left-handed (vertical) polarized signal is supplied from a second circuit. The local oscillator signal is supplied to any input port of the annular transmission line of the rat race circuit and the local oscillator signal is divided into outputs to be fed from respective output ports distant from the input port in the counter-clockwise and clockwise directions respectively each by a predetermined distance. A first mixer circuit mixes the right-handed (horizontal) polarized signal from the first circuit and the local oscillator signal from one output port of the rat race circuit to generate and output the intermediate-frequency signal, and a second mixer circuit mixes the left-handed (vertical) polarized signal from the second circuit and the local oscillator signal from the other output port of the rat race circuit to generate and output the intermediate-frequency signal. Respective intermediate-frequency signals from the first and second mixer circuits are selectively output. Accordingly, the low-noise block down-converter is achieved that is scarcely influenced by matching with respect to mixer circuits, and provides stable performance and high isolation, without increase in the circuit size.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A local oscillator signal divider dividing a local oscillator signal into at least two branch signals to be output, comprising:

a first rat race circuit dividing said local oscillator signal into branch signals to be output, said first rat race circuit including:

a first annular transmission line, a first input port receiving said local oscillator signal and connected to a first node on said first annular transmission line, a first output port connected to a second node on said first annular transmission line, said second node distant from said first node in a first direction by a predetermined distance, a second output port connected to a third node on said first annular transmission line, said third node distant from said first node in a direction opposite to said first direction by said predetermined distance, and a terminator resistor connected to a fourth node on said first annular transmission line, said fourth node distant from said second node by said predetermined distance, wherein a distance from said fourth node to the third node without intersecting the first node is at least three times said predetermined distance.

2. The local oscillator signal divider according to claim 1, wherein said first annular transmission line is formed on a microstrip substrate.

3. The local oscillator signal divider according to claim 1, wherein said first annular transmission line includes a first section extending from said second node to said third node by way of said first node, and a second section extending from said second node to said third node without by way of said first node, and said first section is folded back.

4. The local oscillator signal divider according to claim 3, wherein said first rat race circuit further includes an attenuator circuit provided on a path extending from said first node to said first input port, and said attenuator circuit partially crosses said second section of said first annular transmission line without being electrically connected to said second section.

5. The local oscillator signal divider according to claim 1, further comprising a second rat race circuit receiving one of said branch signals output from said first rat race circuit and dividing the branch signal into further branch signals to be output, said second rat race circuit including a second annular transmission line, a second input port receiving the branch signal output from said first rat race circuit and connected to a fifth node on said second annular transmission line, a third output port connected to a sixth node on said second annular transmission line, said sixth node distant from said fifth node in a second direction by said predetermined distance; and a fourth output port connected to a seventh node on said second annular transmission line, said seventh node distant from said fifth node in a direction opposite to said second direction by said predetermined distance.

6. A low-noise converter receiving a first polarized signal and a second polarized signal and converting the first and second polarized signals respectively into intermediate-frequency signals, comprising:

a first circuit outputting said first polarized signal;

a second circuit outputting said second polarized signal;

a local oscillator circuit outputting a local oscillator signal;

a rat race circuit dividing said local oscillator signal into branch signals to be output, said rat race circuit including an annular transmission line, an input port receiving said local oscillator signal and connected to a first node on said annular transmission line, a first output port connected to a second node on said annular transmission line, said second node distant from said first node in a first direction by a predetermined distance, and a second output port connected to a third node on said annular transmission line, said third node distant from said first node in a direction opposite to said first direction by said predetermined distance, said low-noise converter further comprising a first mixer circuit mixing said first polarized signal supplied from said first circuit with said local oscillator signal supplied from said first output port to output a first intermediate-frequency signal;

a second mixer circuit mixing said second polarized signal supplied from said second circuit with said local oscillator signal supplied from said second output port to output a second intermediate-frequency signal; and a switch circuit selectively outputting one of said first and second intermediate-frequency signals.

7. The low-noise converter according to claim 6, wherein said first polarized signal is right-handed polarized signal, and said second polarized signal is left-handed polarized signal.

8. The low-noise converter according to claim 6, wherein said first polarized signal is horizontally polarized signal, and said second polarized signal is vertically polarized signal.

9. A low-noise converter receiving first to fourth polarized signals and converting said first to fourth polarized signals respectively into intermediate-frequency signals, comprising:

first to fourth circuits outputting said first to fourth polarized signals respectively;

a local oscillator circuit outputting a local oscillator signal;

a first rat race circuit receiving and dividing said local oscillator signal into two first branch signals to be output;

a second rat race circuit provided correspondingly to said first and second circuits, dividing one of said first branch signals output from said first rat race circuit into two second branch signals to be output;

a third rat race circuit provided correspondingly to said third and fourth circuits, dividing the other of said first branch signals output from said first rat race circuit into two third branch signals to be output, said first to third rat race circuits each including an annular transmission line, an input port connected to a first node on said annular transmission line, a first output port connected to a second node on said annular transmission line, said second node distant from said first node in a first direction by a predetermined distance, and a second output port connected to a third node on said annular transmission line, said third node distant from said first node in a direction opposite to said first direction by said predetermined distance, said low-noise converter further comprising a first mixer circuit mixing said first polarized signal supplied from said first circuit with one output of said second rat race circuit to output a first intermediate-frequency signal;

a second mixer circuit mixing said second polarized signal supplied from said second circuit with the other output of said second rat race circuit to output a second intermediate-frequency signal;

a third mixer circuit mixing said third polarized signal supplied from said third circuit with one output of said third rat race circuit to output a third intermediate-frequency signal;

a fourth mixer circuit mixing said fourth polarized signal supplied from said fourth circuit with the other output of said third rat race circuit to output a fourth intermediate-frequency signal; and a switch circuit selectively outputting some of said first to fourth intermediate-frequency signals.

10. The low-noise converter according to claim 9, wherein said first polarized signal is right-handed polarized signal, and said second polarized signal is left-handed polarized signal.

11. The low-noise converter according to claim 9, wherein said first polarized signal is horizontally polarized signal, and said second polarized signal is vertically polarized signal.

* * * * *